March 26, 1940. W. E. MEEK 2,195,010

AUTOMOBILE AIR CONDITIONING APPARATUS

Filed Dec. 13, 1938

Inventor
William E. Meek

By Robb & Robb
Attorneys

Patented Mar. 26, 1940

2,195,010

UNITED STATES PATENT OFFICE 2,195,010

AUTOMOBILE AIR CONDITIONING APPARATUS

William E. Meek, Cleveland, Ohio

Application December 13, 1938, Serial No. 245,520

2 Claims. (Cl. 98—2)

This invention comprises a novel and improved type of air conditioning device for use in automobiles or similar vehicles.

It has been proposed heretofore to employ in automotive vehicles heating or cooling apparatus involving the use of a blower or fan designed to direct warm or cool air toward the front of the vehicle adjacent to the floor and toward the rear. Such devices, so far as I am aware, involve the use of a fan or blower associated with conduits which carry the air in cooled or warm condition to the front or rear portions of the vehicle.

By the apparatus heretofore used, however, the areas above the floor portion of the vehicle which are subjected to the action of the air conditioning operation of the apparatus are restricted, there not being a complete distribution of said air so that the occupants of the front and rear portions of the vehicle will receive the benefit of the air conditioning action.

According to the present invention, it is contemplated to improve upon the prior apparatus above referred to in such a manner as to arrange the air propelling means, such as the fan or blower, beneath the front seat and provide at the front lower portion of the seat, and the rear portion, at opposite sides of the air propelling means, gratings or outlets for the conditioned air which extend substantially the whole width of the vehicle or seat. Moreover, the air propelling means in the form of the fan or blower is so designed that it will force the air, suitably conditioned, in all directions, and especially for the whole transverse area of the seat or interior of the vehicle, thus ensuring that the conditioned air will be so distributed as to pass over the entire floor area in front of the seat, and the corresponding area in rear of the seat.

A full understanding of the invention will be had upon reference to the following description in conjunction with the annexed drawing, in which—

Figure 2:
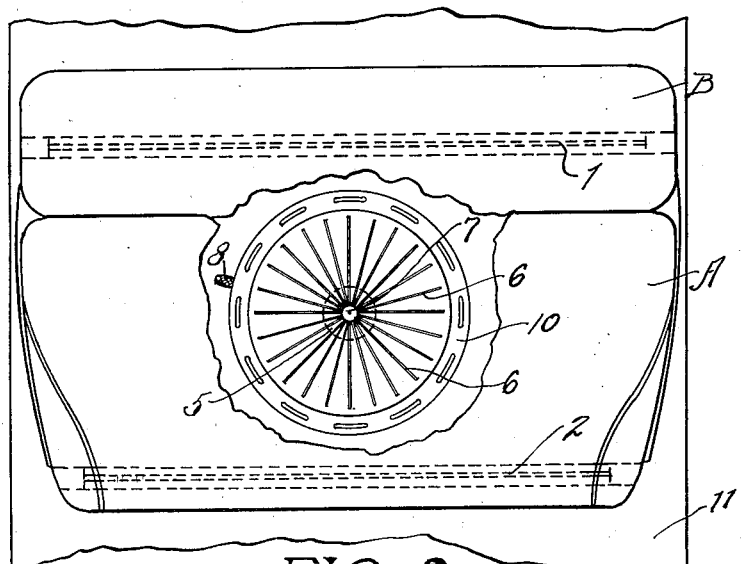
Figure 2 is a top plan view of the same, but with the seat structure broken away at its central portion to illustrate more clearly the air conditioning apparatus.
Figure 1:
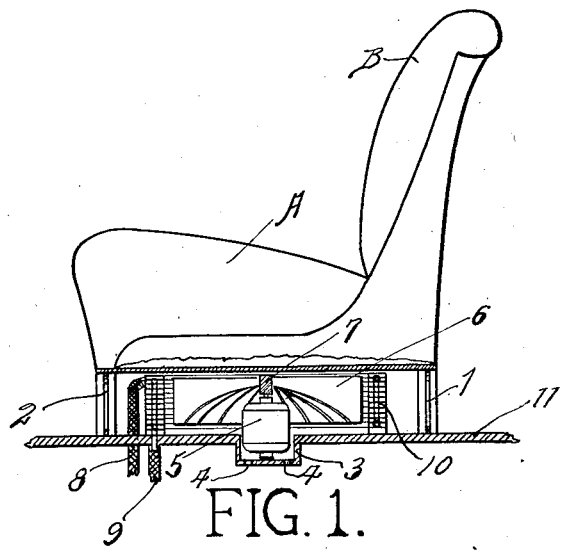
Figure 1 is an end elevation of the seat portion of an automotive vehicle with the air conditioning apparatus disposed below said seat illustrated in section, and the floor of the vehicle likewise shown in section.

Describing the invention specifically as it is related to automotive vehicle use, A in the drawing denotes the seat, or front seat, of an ordinary automobile.

Where the automobile is of the sedan type, there is a floor upon which the seat A is mounted, which floor extends from below to the front and rear of the seat. Where the automotive vehicle is of the coupe type, the floor area to be air conditioned usually extends only in front of the seat. According to the illustration in the drawing the seat A is equipped with the back B in the usual way. The seat A is mounted upon the customary metallic frame structure found in most automobiles according to usual practice, and it is contemplated to provide at the front lower portion of the seat A in the sedan type vehicles the grid plate 2 comprising spaced vertical grid bars, or said plate may be made up of any apertured structure permitting conditioned air to pass therethrough. Likewise, at the rear of the seat, below the back B, a similar grid plate 1 is employed, and, if desired, the plates 1 and 2 may be a part of the supporting frame structure for the seat proper. Mounted below the top frame plate on which the seat A is carried or supported directly is a motor 5 arranged to drive the blades 6 of a rotary fan, said blades being affixed in any suitable manner to the shaft 7 of the motor. The motor 5 may be driven from the storage battery of the vehicle, after the well known manner, and the blades 6 provide a fan or blower of the radial blade type adapted to drive conditioned air in all directions horizontally, beneath the seat A. The intention of the invention is especially that the fan or blower comprising the blades 6 shall be designed to accomplish the action of driving the conditioned air in all radial directions from the axis of said fan or blower and the motor 5.

The floor 11 of the vehicle may be provided with a depression or recess below the motor 5 to partially receive the latter, and the bottom of said recess will be provided with air openings 4 for the admission of fresh air which is to be conditioned.

Surrounding the fan or blower comprising the blades 6 is a radiator 10 which, in the preferred form illustrated, comprises a series of horizontal fins and vertical water tubes, this radiator being adapted to be coupled, by an inlet tube or hose 8 and an outlet tube or hose 9, to the water system of the automobile. However, it is within the purview of the invention that the tubes of the radiator 10 may be connected with a hot air heating system as for instance hot air derived from a casing around the manifold of the engine, if desired.

The operation of my invention according to the construction which has been described above will be clear as now set forth. The motor 5 may be put into operation at any time conditioned air is desired to be availed of in the vehicle. When the motor is started, the turning of the blades 6 of the fan or blower causes air drawn into the space below the seat A through the openings 4 to be propelled radially in all horizontal directions from the axis of the motor and the blower means.

If the air conditioning means is used in the summer, it suffices that the air propelled by the blower or fan be fresh air supplied thereto through the openings 4, and such fresh air will be distributed through the grid plates 1 and 2, if the car be a sedan type, over the entire area of the floor 11 in front and rear of the seat A. If, however, the car be of the coupe type, it will only be desired or necessary that the air be propelled forwardly over the entire floor area in front of the seat A through the grid plate 2.

In colder weather when it is desired that the air propelled by the fan or blower means be heated, the radiator 10 will be in use and will be heated either by air or the water system of the vehicle power unit so that the warm air will be distributed over the entire areas of the floor previously described in reference to the use of fresh cool air admitted through the openings 4 and unheated.

While the radiator 10 is illustrated as of annular form, it would be possible to use a radiator which is square or even in the form of an extended rectangle because of the employment of a fan or blower consisting of radial blades adapted to direct the air in all directions horizontally in the manner described.

Having thus described my invention, what I claim as new and desire to secure by Letters Patent of the United States, is:

1. In air conditioning apparatus for automotive vehicles or the like, a vehicle seat comprising a seat proper, a frame structure upon which the seat is supported and providing a shallow substantially horizontal chamber beneath said seat, said frame structure including seat supporting members providing an air passage coextensive with the entire width of the seat and disposed beneath the same, said chamber being provided with inlet openings for the admission of air, a centrifugal air propelling device mounted in said chamber below the seat at one side of said air passage mounted to rotate about a vertical axis and adapted to propel air in all directions radially and horizontally outwardly therefrom in the plane of said chamber so as to cause it to pass directly from the propelling device to and through said air passage at points over the entire area thereof and thus distribute the air over the floor substantially the entire width of the latter.

2. In air conditioning apparatus for automotive vehicles or the like, in combination, a seat structure comprising a seat proper, a supporting frame for said seat including a top frame plate and front and rear grid plates at the front and rear portions of the seat providing a shallow substantially horizontal chamber beneath said seat, said front and rear plates having air distributing openings therethrough, a rotary centrifugal air propelling device mounted to rotate about a vertical axis arranged in said chamber below the seat and the top frame plate above mentioned and comprising radial blades for propelling air in all radial horizontal directions from the axis of said propelling device outwardly of and in the horizontal plane of said chamber, a floor supporting said air propelling device and said seat and provided with inlet openings for the admission of air to said propelling device, a radiator interposed between the plates and the air propelling device and permitting the air to pass freely in all horizontal radial directions from the air propelling device, the said front and rear plates extending substantially the entire width of the floor area to thereby permit the passage of air propelled by the propelling device over substantially the entire width of the seat.

WILLIAM E. MEEK.